US012714159B2

(12) United States Patent
Maxiell

(10) Patent No.: US 12,714,159 B2
(45) Date of Patent: Aug. 25, 2026

(54) LIGHT EMITTING JERSEY DEVICE

(71) Applicant: Jason Maxiell, Southlake, TX (US)

(72) Inventor: Jason Maxiell, Southlake, TX (US)

( * ) Notice: Subject to any disclaimer, the term of this patent is extended or adjusted under 35 U.S.C. 154(b) by 5 days.

(21) Appl. No.: 18/944,515

(22) Filed: Nov. 12, 2024

(65) Prior Publication Data

US 2026/0130444 A1 May 14, 2026

(51) Int. Cl.

| | |
|---|---|
| ***A41D 1/00*** | (2018.01) |
| ***A41D 1/04*** | (2006.01) |
| ***F21V 23/00*** | (2015.01) |
| ***F21Y 105/10*** | (2016.01) |

(52) U.S. Cl.

CPC ............... *A41D 1/002* (2013.01); *A41D 1/04* (2013.01); *F21V 23/003* (2013.01); *A41D 2600/10* (2013.01); *F21Y 2105/10* (2016.08)

(58) Field of Classification Search

CPC ...... A41D 1/002; A41D 13/01; A41D 27/085; A41D 19/0157; A41D 2600/10; A41D 1/005; F21V 33/0008; B60Q 1/2673; A43B 3/36; G09F 21/023

See application file for complete search history.

(56) References Cited

U.S. PATENT DOCUMENTS

| | | | | |
|---|---|---|---|---|
| 4,296,498 | A | 10/1981 | Vinson | |
| 9,289,018 | B2 | 3/2016 | De Mattei | |
| 9,981,172 | B2 | 5/2018 | Massey | |
| D1,004,254 | S | 11/2023 | Long | |
| 2011/0047669 | A1 | 3/2011 | Carr | |
| 2011/0107636 | A1* | 5/2011 | Bruner | B68C 1/12 40/620 |
| 2012/0212938 | A1* | 8/2012 | Nguyen | F21L 4/00 362/104 |
| 2014/0151416 | A1* | 6/2014 | Ishihara | A41D 1/002 224/182 |
| 2015/0221009 | A1* | 8/2015 | Lory | G06Q 30/0621 705/26.5 |
| 2016/0267817 | A1 | 9/2016 | McKee | |
| 2016/0345655 | A1* | 12/2016 | Beers | A41D 1/002 |
| 2019/0246733 | A1* | 8/2019 | Tseng | A43B 3/36 |
| 2019/0320736 | A1* | 10/2019 | Gonsalves | A41D 1/04 |
| 2019/0384556 | A1* | 12/2019 | De Backer | A41D 1/005 |
| 2023/0000180 | A1 | 1/2023 | Buzzini | |

FOREIGN PATENT DOCUMENTS

| | | |
|---|---|---|
| CA | 930378 | 11/2016 |

* cited by examiner

*Primary Examiner* — Grady Alexander Nunnery

(57) ABSTRACT

A light emitting jersey device includes a jersey worn on a player of a sports team. A plurality of front lights is integrated into a front side of the jersey. A plurality of back lights is integrated into a back side of the jersey. A control housing is attached to the jersey and a processor is positioned within the control housing. An electronic memory is positioned within the control housing which stores a plurality of digits. A first digit selector button is movably positioned in the control housing for controlling a first digit each of the plurality of front lights and the plurality of back lights is actuated to display. A second digit selector button is movably positioned in the control housing for controlling a second digit each of the plurality of front lights and the plurality of back lights is actuated to display.

17 Claims, 6 Drawing Sheets

LIGHT EMITTING JERSEY DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to jersey devices and more particularly pertains to a new jersey device for enabling a number assigned to a player to be brightly displayed on a jersey. The device includes a jersey that is worn on a player and a control housing attached to the jersey. The device includes a plurality of front lights integrated into a front side of the jersey and a plurality of back lights integrated into a back side of the jersey. The device includes a first digit selector button which is integrated into the control housing for selecting the first digit each of the front lights and the back lights are actuated to display. The device includes a second digit selector button which is integrated into the control housing for selecting the second digit each of the front lights and the back lights are actuated to display.

(2) Description of Related Art Including Information Disclosed Under 37 CFR 1.97 and 1.98

The prior art relates to jersey devices including: a jersey with a flap that that is hinged to the jersey to enable the flap to be positioned on a front side or a back side of the jersey for displaying a number printed on the flap; a wearable display device that includes a garment and a display panel which is removably attachable to the garment that can be programmed to display a variety of images; a garment device that includes a series of electronic components attached to an existing panel of a garment which includes video cameras and video and audio output devices; a variety of athletic coaching devices that each at least includes a jersey and a number panel that is removably attachable to the jersey for displaying a number assigned to a player; a jersey device that includes a panel which is comprised of a series of foldable flaps to enable the panel to be shaped to display a variety of digits on a jersey; a garment system that includes a garment and a flexible display attached to the garment for displaying imagery and a sensor to change imagery that is displayed on the flexible display. In no instance does the prior art disclose an illuminated jersey device that includes a jersey and a plurality of front lights applied to a front side of the jersey and a plurality of back lights applied to a back side of the jersey and a control panel attached to the jersey for selecting a two digit number that each of the front lights and the back lights are actuated to display.

BRIEF SUMMARY OF THE INVENTION

An embodiment of the disclosure meets the needs presented above by generally comprising a jersey worn on a player of a sports team. A plurality of front lights is integrated into a front side of the jersey. A plurality of back lights is integrated into a back side of the jersey. A control housing is attached to the jersey and a processor is positioned within the control housing. An electronic memory is positioned within the control housing which stores a plurality of digits. A first digit selector button is movably positioned in the control housing for controlling a first digit each of the plurality of front lights and the plurality of back lights is actuated to display. A second digit selector button is movably positioned in the control housing for controlling a second digit each of the plurality of front lights and the plurality of back lights is actuated to display.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
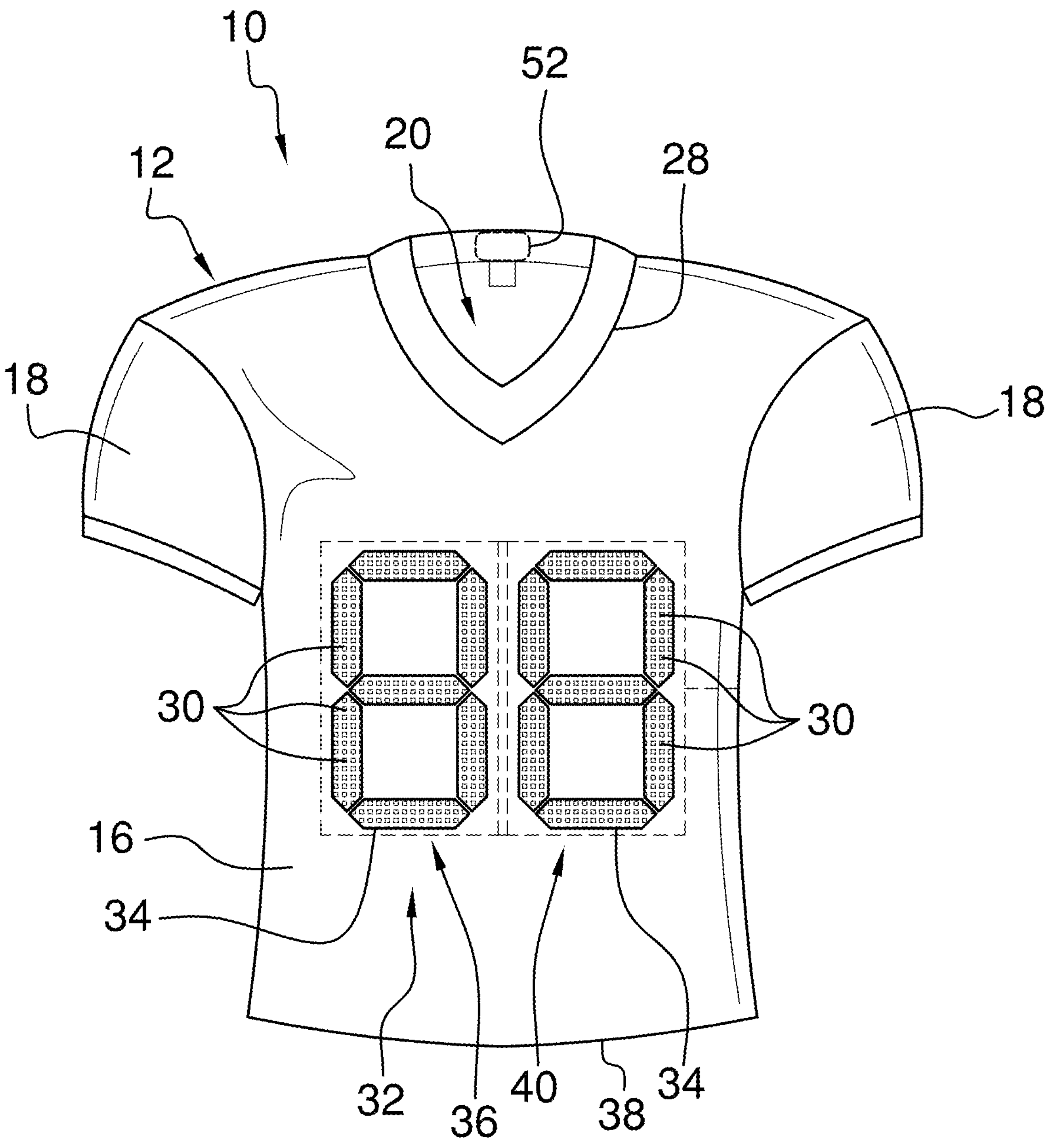
FIG. 1 is a front view of a light emitting jersey device according to an embodiment of the disclosure.
Figure 2:
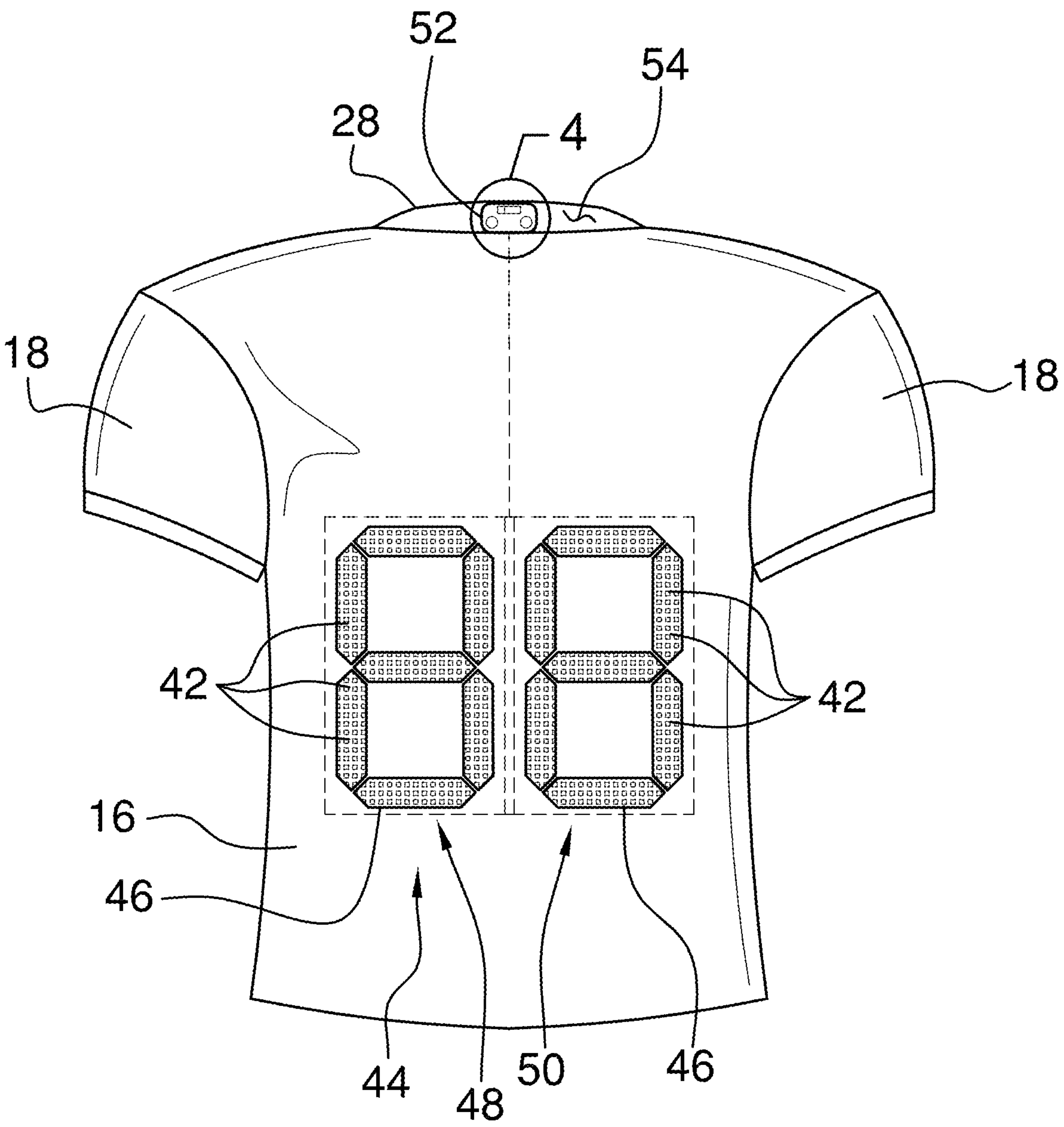
FIG. 2 is a back view of an embodiment of the disclosure.

With reference now to the drawings, and in particular to FIGS. 1 through 6 thereof, a new jersey device embodying the principles and concepts of an embodiment of the disclosure and generally designated by the reference numeral 10 will be described.

As best illustrated in FIGS. 1 through 6, the light emitting jersey device 10 generally comprises a jersey 12 which can be worn on a player 14 of a sports team. The jersey 12 is comprised of a mesh material to enable air to flow through the jersey 12. The jersey 12 has a body 16, a pair of sleeves 18 and a neck opening 20. The body 16 covers the player's torso 22 having each of the player's arms 24 extending through a respective sleeve 18 of the pair of sleeves 18 and having the player's neck 26 extending through the neck opening 20. Additionally, the jersey 12 has a collar 28 extending around the neck opening 20. The jersey 12 may practice jersey for a football team, a basketball team, a soccer team or any other type of team associated with organized sports. Furthermore, the mesh material is brightly colored, such as blaze orange for example, to enable the jersey 12 to be highly visible from a distance.

A plurality of front lights 30 is provided and each front light 30 of the plurality of front lights 30 is integrated into a front side 32 of the body 16 of the jersey 12. Each front light 30 of the plurality of front lights 30 can be actuated to emit light outwardly from the front side 32. The plurality of front lights 30 is arranged to from a pair of numerals 34 of the plurality of front lights 30 on the front side 32 of the body 16. A left numeral 36 of the pair of numerals 34 of the plurality of front lights 30 is positioned on a left side of a center of the front side 32 of the body 16 of the jersey 12. The left numeral 36 of the pair of numerals 34 of the plurality of front lights 30 comprises a numeral eight which is defined by a series of perpendicularly oriented lines. Additionally, the left numeral 36 of the pair of numerals 34 of the plurality of front lights 30 is centrally located between the collar 28 and a bottom edge 38 of the body 16 of the jersey 12. A right numeral 40 of the pair of numerals 34 of the plurality of front lights 30 is positioned on a right side of the center of the front side 32 of the body 16 of the jersey 12. The right numeral 40 of the pair of numerals 34 of the plurality of front lights 30 comprises a numeral eight which is defined by a series of perpendicularly oriented lines. The right numeral 40 of the pair of numerals 34 of the plurality of front lights 30 is centrally located between the collar 28 and the bottom edge 38 of the body 16 of the jersey 12. Additionally, each front light 30 of the plurality of front lights 30 may comprise an impact resistant light emitting diode or other type of electronic light emitter that is highly resistant to impact. In this way the plurality of front lights 30 can withstand the impact resulting from the player 14 being tackled during football practice, for example.

A plurality of back lights 42 is provided and each back light 42 of the plurality of back lights 42 is integrated into a back side 44 of the body 16 of the jersey 12. Each back light 42 of the plurality of back lights 42 can be actuated to emit light outwardly from the back side 44. The plurality of back lights 42 is arranged to form a pair of numerals 46 of the plurality of back lights 42 on the back side 44 of the body 16. A left numeral 48 of the pair of numerals 46 of the plurality of back lights 42 is positioned on a left side of a center of the back side 44 of the body 16 of the jersey 12. The left numeral 48 of the pair of numerals 46 of the plurality of back lights 42 comprises a numeral eight which is defined by a series of perpendicularly oriented lines. Additionally, the left numeral 48 of the pair of numerals 46 of the plurality of back lights 42 is centrally located between the collar 28 and the bottom edge 38 of the body 16 of the jersey 12. A right numeral 50 of the pair of numerals 46 of the plurality of back lights 42 is positioned on a right side of the center of the back side 44 of the body 16 of the jersey 12. The right numeral 50 of the pair of numerals 46 of the plurality of back lights 42 is centrally located between the collar 28 and the bottom edge 38 of the body 16 of the jersey 12. The right numeral 50 of the pair of numerals 46 of the plurality of back lights 42 comprises a numeral eight which is defined by a series of perpendicularly oriented lines. Additionally, each back light 42 of the plurality of back lights 42 may comprise an impact resistant light emitting diode or other type of electronic light emitter that is highly resistant to impact. In this way the plurality of back lights 42 can withstand the impact resulting from the player 14 being tackled during football practice, for example.

A control housing 52 is provided and the control housing 52 is attached to the jersey 12. The control housing 52 is located on a portion of the collar 28 which extends around the back side 44 of the body 16 of the jersey 12. The control housing 52 is located on an outwardly facing surface 54 of the collar 28 such that the control housing 52 is accessible to the player 14. As is shown an alternative embodiment 55 shown in FIG. 5, the control housing 52 may be located adjacent to the bottom edge 38 of the body 16 of the jersey 12. Furthermore, the plurality of front lights 30 are arranged to define a grid and the plurality of back lights 42 are arranged to define a grid.

Figure 3:
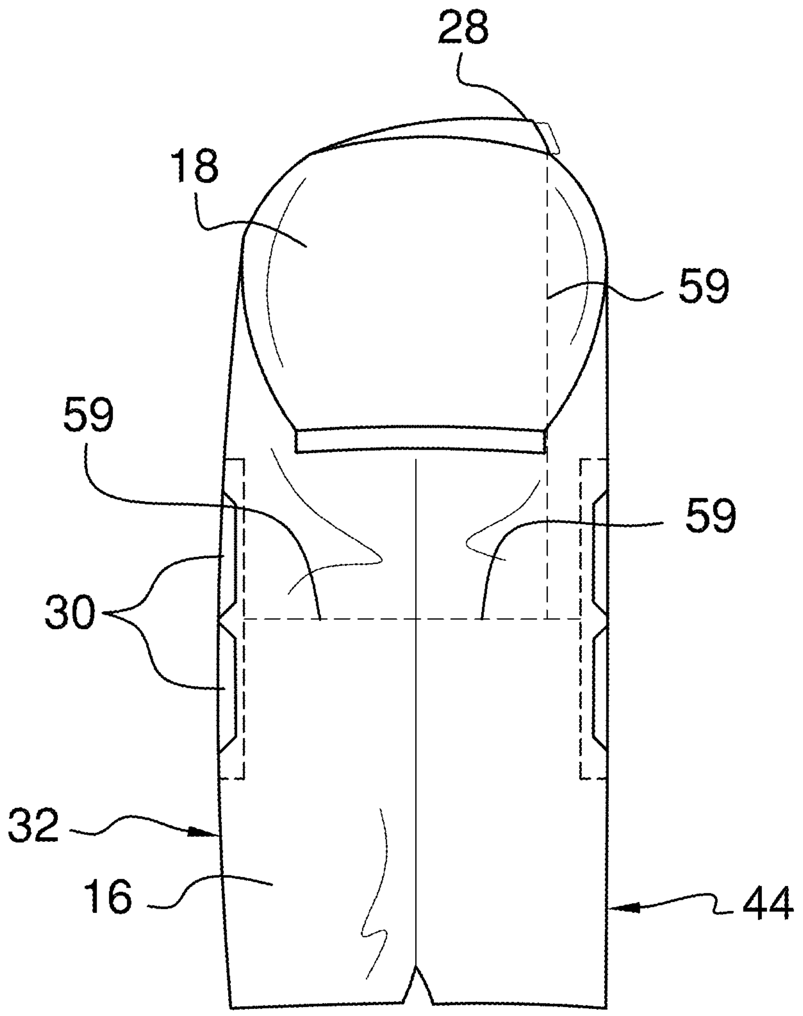
FIG. 3 is a left side phantom view of an embodiment of the disclosure.
Figure 4:
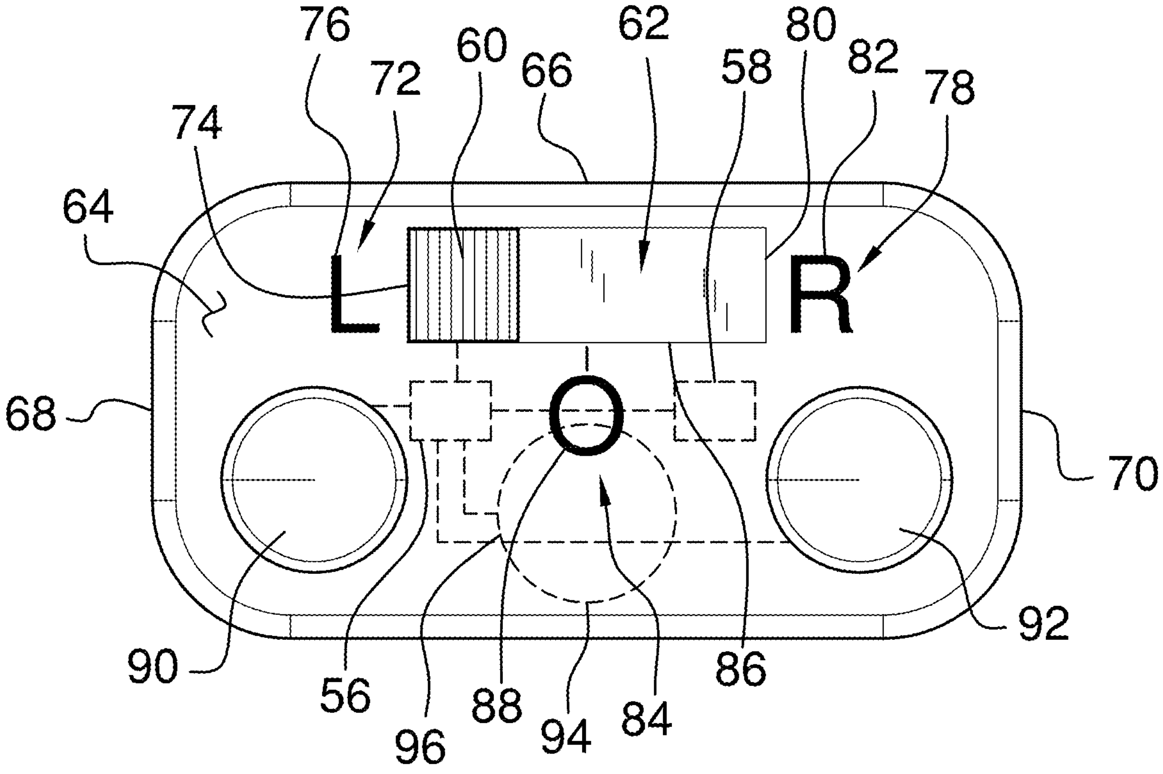
FIG. 4 is a magnified phantom view taken from circle 4 of FIG. 2 of an embodiment of the disclosure.
Figure 5:
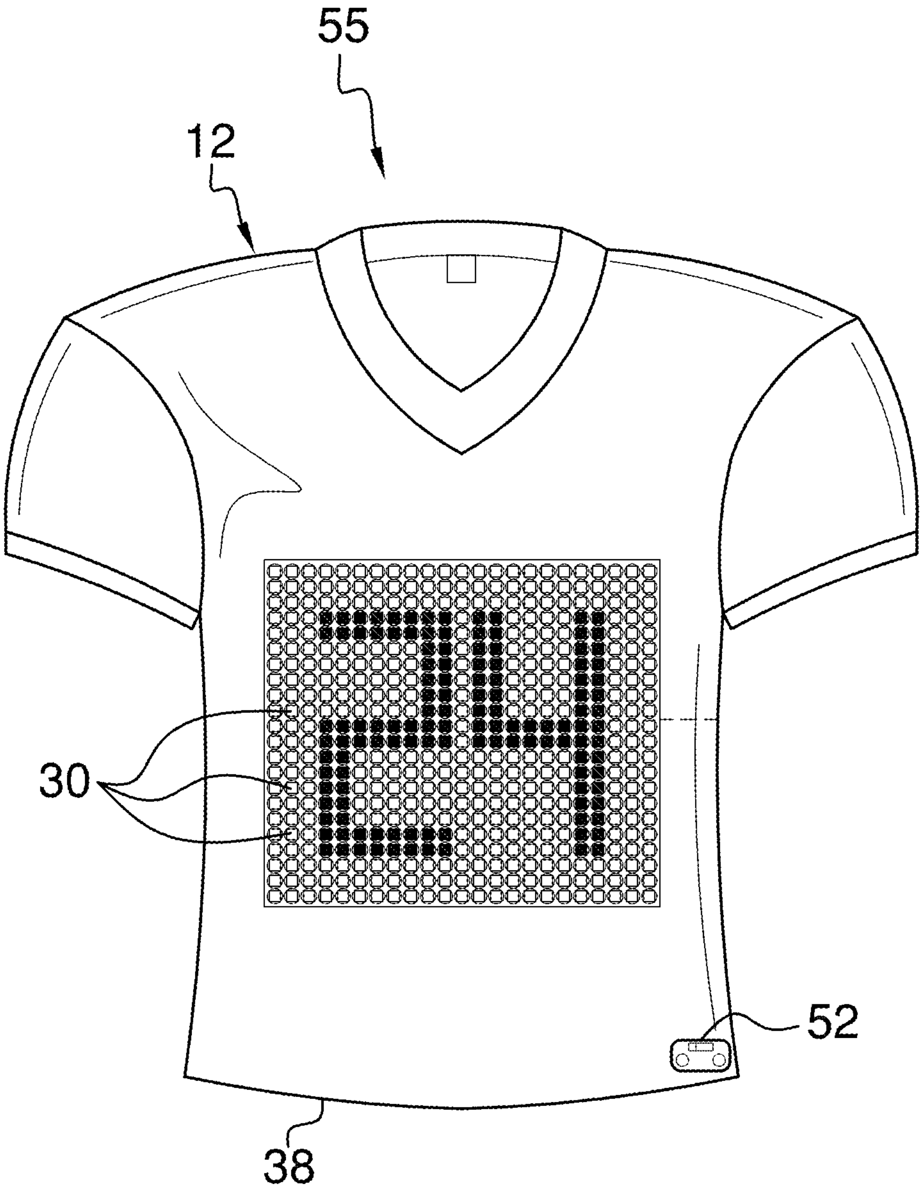
FIG. 5 is a front view of an alternative embodiment of the disclosure.
Figure 6:
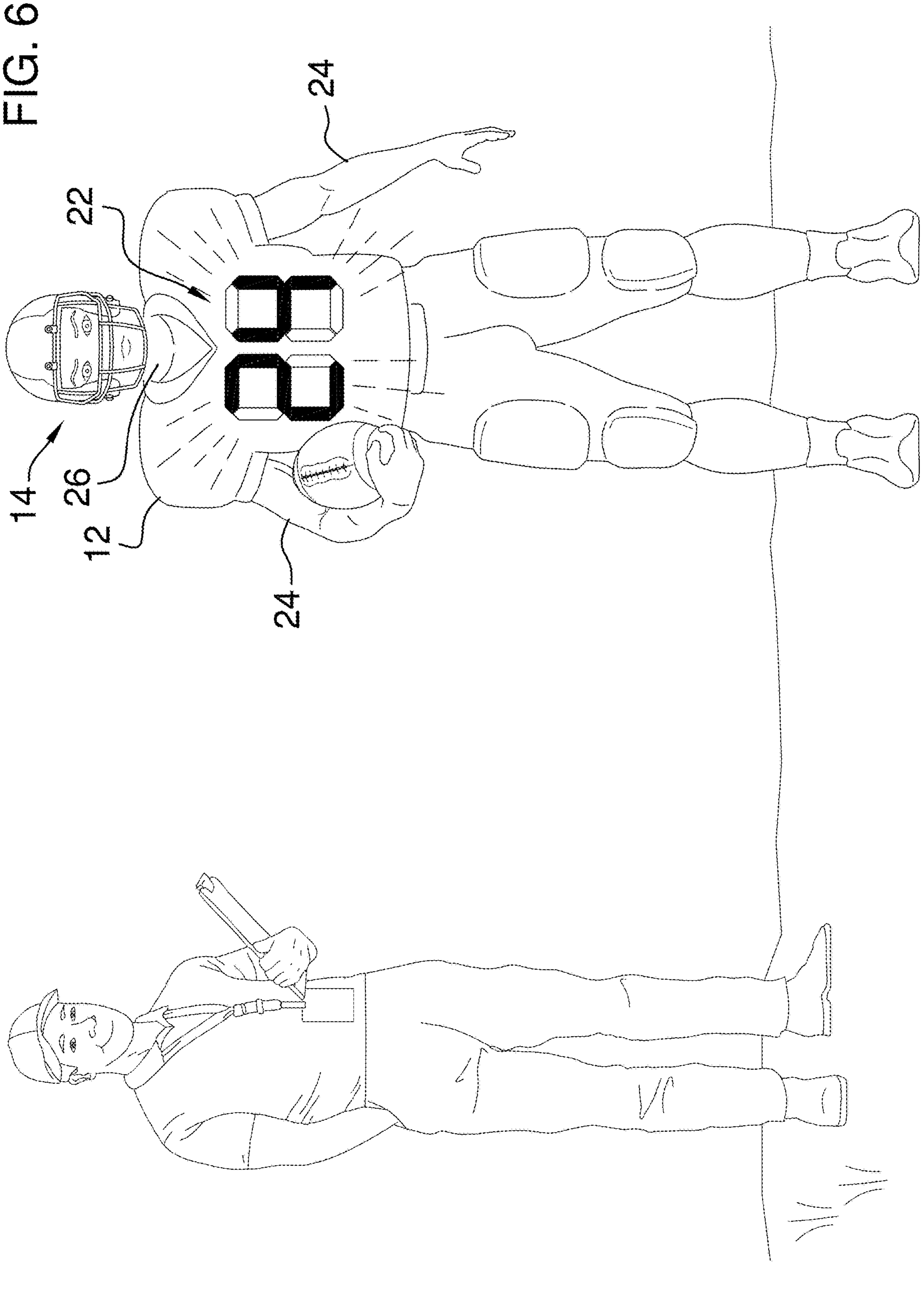
FIG. 6 is a perspective in-use view of an embodiment of the disclosure.

A processor 56 is provided and the processor 56 is positioned within the control housing 52. The processor 56 is in electrical communication with each front light 30 of the plurality of front lights 30. Additionally, the processor 56 is in electrical communication with each back light 42 of the plurality of back lights 42. An electronic memory 58 is positioned within the control housing 52 and the electronic memory 58 is in electrical communication with the processor 56. Furthermore, the electronic memory 58 stores a database comprising a plurality of digits ranging between zero and nine. As is shown in FIG. 3, a series of conductors 59 is integrated into the jersey 12, comprising an electrically conductive material, which are electrically coupled between the plurality of front lights 30 and the plurality back lights 42 and the processor 56 to facilitate electrical communication between the processor 56 and each of the plurality of front lights 30 and each of the plurality of back lights 42.

A selector switch 60 is slidably integrated into the control housing 52 and the selector switch 60 is in electrical communication with the processor 56. The selector switch 60 is positionable in an off position and the processor 56 is de-actuated when the selector switch 60 is in the off position. The selector switch 60 is positionable in a left position. Each front light 30 of the plurality of front lights 30 associated with the left numeral 36 of the pair of numerals 34 of the plurality of front lights 30 is actuated into a standby mode when the selector switch 60 is positioned in the left position. Additionally, each back light 42 of the plurality of back lights 42 associated with the left numeral 48 of the pair of numerals 46 of the plurality of back lights 42 is actuated into a standby mode when the selector switch 60 is positioned in the left position.

The selector switch 60 is positionable in a right position. Each front light 30 of the plurality of front lights 30 associated with the right numeral 40 of the pair of numerals 34 of the plurality of front lights 30 is actuated into a standby mode when the selector switch 60 is positioned in the right position. Additionally, each back light 42 of the plurality of back lights 42 associated with the right numeral 50 of the pair of numerals 46 of the plurality of back lights 42 is actuated into a standby mode when the selector switch 60 is positioned in the right position. The selector switch 60 is laterally slidable along a channel 62 which is recessed into an outwardly facing surface 64 of the control housing 52. The channel 62 is positioned beneath a top side 66 of the control housing 52. Additionally, the channel 62 is elongated along an axis extending between a first lateral side 68 of the control housing 52 and a second lateral side 70 of the control housing 52.

Left indicia 72 which are applied to the outwardly facing surface 64 of the control housing 52. The left indicia 72 are positioned between a first lateral bounding edge 74 of the channel 62 and the first lateral side 68 of the control housing 52. Additionally, the left indicia 72 comprise the letter "L" 76. Right indicia 78 are applied to the outwardly facing surface 64 of the control housing 52. The right indicia 78 are positioned between a second lateral bounding edge 80 of the channel 62 and the first lateral side 68 of the control housing 52. Additionally, the right indicia 78 comprise the letter "R" 82. Off indicia 84 are applied to the outwardly facing surface 64 of the control housing 52. The off indicia 84 are positioned beneath a lower bounding edge 86 of the channel 62 and the off indicia 84 are centrally located between the first lateral bounding edge 80 of the channel 62 and the second lateral bounding edge 80 of the channel 62. Additionally, the off indicia 84 comprise the letter "O" 88.

A first digit selector button 90 is movably positioned in the control housing 52 and the first digit selector button 90 is in electrical communication with the processor 56. The electronic memory 58 communicates a respective digit of the plurality of digits to the processor 56 each time the first digit selector button 90 is pressed. In this way the first digit selector button 90 controls a first digit of the plurality of digits each of the plurality of front lights 30 and the plurality of back lights 42 is actuated to display. The plurality of front lights 30 associated with the left numeral 36 of the pair of numerals 34 of the plurality of front lights 30 is actuated in a pattern which corresponds to the respective digit of the plurality of digits each time the first digit selector button 90 is depressed when the selector switch 60 is in the left position. In this way the first digit selector button 90 enables the player 14 to determine which digit of the plurality of digits the left numeral 36 of the pair of numerals 34 of the plurality of front lights 30 is actuated to display.

The plurality of back lights 42 associated with the left numeral 48 of the pair of numerals 46 of the plurality of back lights 42 is actuated in a pattern which corresponds to the respective digit of the plurality of digits each time the first digit selector button 90 is depressed when the selector switch 60 is in the left position. In this way the first digit selector button 90 enables the player 14 to determine which digit of the plurality of digits the left numeral 48 of the pair of numerals 46 of the plurality of back lights 42 is actuated to display. The plurality of front lights 30 associated with the right numeral 40 of the pair of numerals 34 of the plurality of front lights 30 is actuated in a pattern which corresponds to the respective digit of the plurality of digits each time the first digit selector button 90 is depressed when the selector switch 60 is in the right position. In this way the first digit selector button 90 enables the player 14 to determine which digit of the plurality of digits the right numeral 40 of the pair of numerals 34 of the plurality of front lights 30 is actuated to display. The plurality of back lights 42 associated with the right numeral 50 of the pair of numerals 46 of the plurality of back lights 42 is actuated in a pattern which corresponds to the respective digit of the plurality of digits each time the first digit selector button 90 is depressed when the selector switch 60 is in the right position. In this way the first digit selector button 90 enables the player 14 to determine which digit of the plurality of digits the right numeral 50 of the pair of numerals 46 of the plurality of back lights 42 is actuated to display.

The first digit selector button 90 is depressible with respect to the outwardly facing surface 64 of the control housing 52. Additionally, the first digit selector button 90 is positioned between the channel 62 in the outwardly facing surface 64 of the control housing 52 and a bottom side of the control housing 52. The first digit selector button 90 is positioned closer to the first lateral side 68 of the control housing 52 than the second lateral side 70 of the control housing 52. Furthermore, the first digit selector button 90 is comprised of a deformable material, including but not being limited to rubber or silicone, to enhance comfort for the user when the user presses the first digit selector button 90.

A second digit selector button 92 is movably positioned in the control housing 52 and the second digit selector button 92 is in electrical communication with the processor 56. The electronic memory 58 communicates a respective digit of the plurality of digits to the processor 56 each time the second digit selector button 92 is pressed for controlling a second digit of the plurality of digits each of the plurality of front lights 30 and the plurality of back lights 42 is actuated to display. The plurality of front lights 30 associated with the left numeral 36 of the pair of numerals 34 of the plurality of front lights 30 is actuated in a pattern which corresponds to the respective digit of the plurality of digits each time the second digit selector button 92 is depressed when the selector switch 60 is in the left position. In this way the second digit selector button 92 enables the player 14 to determine which digit of the plurality of digits the left numeral 36 of the pair of numerals 34 of the plurality of front lights 30 is actuated to display.

The plurality of back lights 42 associated with the left numeral 48 of the pair of numerals 46 of the plurality of back lights 42 is actuated in a pattern which corresponds to the respective digit of the plurality of digits each time the second digit selector button 92 is depressed when the selector switch 60 is in the left position. In this way the second digit selector button 92 enables the player 14 to determine which digit of the plurality of digits the left numeral 48 of the pair of numerals 46 of the plurality of back lights 42 is actuated to display. The plurality of front lights 30 associated with the right numeral 40 of the pair of numerals 34 of the plurality of front lights 30 is actuated in a pattern which corresponds to the respective digit of the plurality of digits each time the second digit selector button 92 is depressed when the selector switch 60 is in the right position. In this way the second digit selector button 92 enables the player 14 to determine which digit of the plurality of digits the right numeral 40 of the pair of numerals 34 of the plurality of front lights 30 is actuated to display. The plurality of back lights 42 associated with the right numeral 50 of the pair of numerals 46 of the plurality of back lights 42 is actuated in a pattern which corresponds to the respective digit of the plurality of digits each time the second digit selector button 92 is depressed when the selector switch 60 is in the right position. In this way the second digit selector button 92 enables the player 14 to determine which digit of the plurality of digits the right numeral 50 of the pair of numerals 46 of the plurality of back lights 42 is actuated to display.

The second digit selector button 92 is depressible with respect to the outwardly facing surface 64 of the control housing 52. The second digit selector button 92 is positioned between the channel 62 in the outwardly facing surface 64 of the control housing 52 and the bottom side of the control housing 52. Additionally, the second digit selector button 92 is positioned closer to the first lateral side 68 of the control housing 52 than the second lateral side 70 of the control housing 52. The second digit selector button 92 is comprised of a deformable material, including but not being limited to rubber or silicone, to enhance comfort for the user when the user presses the second digit selector button 92. A power supply 94 is positioned within the control housing 52, the power supply 94 is in electrical communication with the processor 56 and the power supply 94 comprises at least one battery 96.

In use, the selector switch 60 is moved into the left position and the first digit selector button 90 is pressed the requisite number of times to enable the left numeral 48 of the back lights 42 and the left numeral 36 of the front lights 30 to be actuated to display the desired digit. The selector switch 60 is moved into the right position and the second digit selector button 92 is pressed the requisite number of times to enable right numeral 50 of the back lights 42 and the right numeral 40 of the front lights 30 to display the desired digit. In this way the two digit number that is assigned to the player 14 can be brightly displayed on the jersey 12 to enable talent scouts, for example, to be able to clearly read the two digit number on the player's 14 jersey 12. Furthermore, the need to temporarily display a number panel on the jersey 12 with athletic tape, as is commonly practiced during practice sessions of football for example, is eliminated thereby saving time for athletic trainers as well as eliminating wasteful use of athletic tape.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A light emitting jersey device for enabling numbers assigned to a player to be visually displayed, said device comprising:

a jersey being configured to be worn on a player of a sports team, said jersey being comprised of a mesh material wherein said jersey is configured to enable air to flow through said jersey, said jersey having a body and a pair of sleeves and a neck opening wherein said body is configured to cover a torso of the player having each of a pair of arms of the player extending through a respective sleeve of said pair of sleeves and having a neck of the player extending through said neck opening, said jersey having a collar extending around said neck opening;

a plurality of front lights, each front light of said plurality of front lights being integrated into a front side of said body of said jersey wherein each front light of said plurality of front lights is configured to emit light outwardly from said front side;

a plurality of back lights, each back light of said plurality of back lights being integrated into a back side of said body of said jersey wherein each back light of said plurality of back lights is configured to emit light outwardly from said back side;

a control housing being attached to said jersey;

a processor being positioned within said control housing, said processor being in electrical communication with each front light of said plurality of front lights, said processor being in electrical communication with each back light of said plurality of back lights;

an electronic memory being positioned within said control housing, said electronic memory being in electrical communication with said processor, said electronic memory storing a database comprising a plurality of digits ranging between zero and nine;

a first digit selector button being movably positioned in said control housing, said first digit selector button being in electrical communication with said processor, said electronic memory communicating a respective digit of said plurality of digits to said processor each time said first digit selector is pressed for controlling a first digit of said plurality of digits each of said plurality of front lights and said plurality of back lights is actuated to display;

a second digit selector button being movably positioned in said control housing, said second digit selector button being in electrical communication with said processor, said electronic memory communicating a respective digit of said plurality of digits to said processor each time said second digit selector is pressed for controlling a second digit of said plurality of digits each of said plurality of front lights and said plurality of back lights is actuated to display;

wherein said plurality of front lights is arranged to from a pair of numerals of said plurality of front lights on said front side of said body;

wherein a left numeral of said pair of numerals of said plurality of front lights is positioned on a left side of a center of said front side of said body of said jersey;

wherein said left numeral of said pair of numerals of said plurality of front lights is centrally located between said collar and a bottom edge of said body of said jersey;

wherein a right numeral of said pair of numerals of said plurality of front lights is positioned on a right side of said center of said front side of said body of said jersey;

wherein said right numeral of said pair of numerals of said plurality of front lights is centrally located between said collar and said bottom edge of said body of said jersey;

wherein said plurality of back lights is arranged to form a pair of numerals of said plurality of said back lights on said back side of said body;

wherein a left numeral of said pair of numerals of said plurality of back lights is positioned on a left side of a center of said back side of said body of said jersey;

wherein said left numeral of said pair of numerals of said plurality of back lights is centrally located between said collar and said bottom edge of said body of said jersey;

wherein a right numeral of said pair of numerals of said plurality of back lights is positioned on a right side of said center of said back side of said body of said jersey;

wherein said right numeral of said pair of numerals of said plurality of back lights is centrally located between said collar and said bottom edge of said body of said jersey;

wherein said light emitting jersey device includes a selector switch being slidably integrated into said control housing;

wherein said selector switch is in electrical communication with said processor;

wherein said selector switch is positionable in an off position;

wherein said processor is de-actuated when said selector switch is in said off position;

wherein said selector switch is positionable in a left position;

wherein said selector switch is positionable in a right position;

wherein each front light of said plurality of front lights associated with said left numeral of said pair of numerals of said plurality of front lights is actuated into a standby mode when said selector switch is positioned in said left position;

wherein each back light of said plurality of back lights associated with said left numeral of said pair of numerals of said plurality of back lights is actuated into a standby mode when said selector switch is positioned in said left position;

wherein each front light of said plurality of front lights associated with said right numeral of said pair of numerals of said plurality of front lights is actuated into a standby mode when said selector switch is positioned in said right position; and wherein each back light of said plurality of back lights associated with said right numeral of said pair of numerals of said plurality of back lights is actuated into a standby mode when said selector switch is positioned in said right position.

2. The light emitting jersey device according to claim 1, wherein:

said control housing is located on a portion of said collar which extends around said back side of said body of said jersey; and said control housing is located on an outwardly facing surface of said collar wherein said control housing is configured to be accessible to the player.

3. The light emitting jersey device according to claim 1, wherein:

said selector switch is laterally slidable along a channel which is recessed into an outwardly facing surface of said control housing;

said channel is positioned beneath a top side of said control housing; and said channel is elongated along an axis extending between a first lateral side of said control housing and a second lateral side of said control housing.

4. The light emitting jersey device according to claim 3, wherein:

said control housing has left indicia being applied to said outwardly facing surface of said control housing;

said left indicia are positioned between a first lateral bounding edge of said channel and said first lateral side of said control housing; and said left indicia comprise the letter "L".

5. The light emitting jersey device according to claim 3, wherein:

aid control housing has right indicia being applied to said outwardly facing surface of said control housing;

said right indicia are positioned between a second lateral bounding edge of said channel and said second lateral side of said control housing; and said right indicia comprise the letter "R".

6. The light emitting jersey device according to claim 3, wherein:

said control housing has off indicia being applied to said outwardly facing surface of said control housing;

said off indicia are positioned beneath a lower bounding edge of said channel, said off indicia being centrally located between said first lateral bounding edge of said channel and said second lateral bounding edge of said channel; and said off indicia comprise the letter "O".

7. The light emitting jersey device according to claim 1, wherein said plurality of front lights associated with said left numeral of said pair of numerals of said plurality of front lights is actuated in a pattern which corresponds to said respective digit of said plurality of digits stored in said electronic memory each time said first digit selector button is depressed when said selector switch is in said left position wherein said first digit selector button is configured to enable the player to determine which digit of said plurality of digits said left numeral of said pair of numerals of said plurality of front lights is actuated to display.

8. The light emitting jersey device according to claim 1, wherein said plurality of back lights associated with said left numeral of said pair of numerals of said plurality of back lights is actuated in a pattern which corresponds to said respective digit of said plurality of digits stored in said electronic memory each time said first digit selector button is depressed when said selector switch is in said left position wherein said first digit selector button is configured to enable the player to determine which digit of said plurality of digits said left numeral of said pair of numerals of said plurality of back lights is actuated to display.

9. The light emitting jersey device according to claim 1, wherein said plurality of front lights associated with said right numeral of said pair of numerals of said plurality of front lights is actuated in a pattern which corresponds to said respective digit of said plurality of digits stored in said electronic memory each time said first digit selector button is depressed when said selector switch is in said right position wherein said first digit selector button is configured to enable the player to determine which digit of said plurality of digits said right numeral of said pair of numerals of said plurality of front lights is actuated to display.

10. The light emitting jersey device according to claim 1, wherein said plurality of back lights associated with said right numeral of said pair of numerals of said plurality of back lights is actuated in a pattern which corresponds to said respective digit of said plurality of digits stored in said electronic memory each time said first digit selector button is depressed when said selector switch is in said right position wherein said first digit selector button is configured to enable the player to determine which digit of said plurality of digits said right numeral of said pair of numerals of said plurality of back lights is actuated to display.

11. The light emitting jersey device according to claim 1, wherein:

said first digit selector button is depressible with respect to an outwardly facing surface of said control housing; and said first digit selector button is comprised of a deformable material wherein said first digit selector button is configured to enhance comfort for the user when the user presses said first digit selector button.

12. The light emitting jersey device according to claim 1, wherein:

said second digit selector button is depressible with respect to an outwardly facing surface of said control housing; and said second digit selector button is comprised of a deformable material wherein said second digit selector button is configured to enhance comfort for the user when the user presses said second digit selector button.

13. The light emitting jersey device according to claim 1, wherein said plurality of front lights associated with said left numeral of said pair of numerals of said plurality of front lights is actuated in a pattern which corresponds to said respective digit of said plurality of digits stored in said electronic memory each time said second digit selector button is depressed when said selector switch is in said left position wherein said second digit selector button is configured to enable the player to determine which digit of said plurality of digits said left numeral of said pair of numerals of said plurality of front lights is actuated to display.

14. The light emitting jersey device according to claim 1, wherein said plurality of back lights associated with said left numeral of said pair of numerals of said plurality of back lights is actuated in a pattern which corresponds to said respective digit of said plurality of digits each time said second digit selector button is depressed when said selector switch is in said left position wherein said second digit selector button is configured to enable the player to determine which digit of said plurality of digits said left numeral of said pair of numerals of said plurality of back lights is actuated to display.

15. The light emitting jersey device according to claim 1, wherein said plurality of front lights associated with said right numeral of said pair of numerals of said plurality of front lights is actuated in a pattern which corresponds to said respective digit of said plurality of digits each time said second digit selector button is depressed when said selector switch is in said right position wherein said second digit selector button is configured to enable the player to determine which digit of said plurality of digits said right numeral of said pair of numerals of said plurality of front lights is actuated to display.

16. The light emitting jersey device according to claim 1, wherein said plurality of back lights associated with said right numeral of said pair of numerals of said plurality of back lights is actuated in a pattern which corresponds to said respective digit of said plurality of digits each time said second digit selector button is depressed when said selector switch is in said right position wherein said second digit selector button is configured to enable the player to determine which digit of said plurality of digits said right numeral of said pair of numerals of said plurality of back lights is actuated to display.

17. A light emitting jersey device for enabling numbers assigned to a player to be visually displayed, said device comprising:

a jersey being configured to be worn on a player of a sports team, said jersey being comprised of a mesh material wherein said jersey is configured to enable air to flow through said jersey, said jersey having a body and a pair of sleeves and a neck opening wherein said body is configured to cover a torso of the player having each of a pair of arms of the player extending through a respective sleeve of said pair of sleeves and having a neck of the player extending through said neck opening, said jersey having a collar extending around said neck opening;

a plurality of front lights, each front light of said plurality of front lights being integrated into a front side of said body of said jersey wherein each front light of said plurality of front lights is configured to emit light outwardly from said front side, said plurality of front lights being arranged to from a pair of numerals of said plurality of front lights on said front side of said body, a left numeral of said pair of numerals of said plurality of front lights being positioned on a left side of a center of said front side of said body of said jersey, said left numeral of said pair of numerals of said plurality of front lights being centrally located between said collar and a bottom edge of said body of said jersey, a right numeral of said pair of numerals of said plurality of front lights being positioned on a right side of said center of said front side of said body of said jersey, said right numeral of said pair of numerals of said plurality of front lights being centrally located between said collar and said bottom edge of said body of said jersey;

a plurality of back lights, each back light of said plurality of back lights being integrated into a back side of said body of said jersey wherein each back light of said plurality of back lights is configured to emit light outwardly from said back side, said plurality of back lights being arranged to form a pair of numerals of said plurality of said back lights on said back side of said body, a left numeral of said pair of numerals of said plurality of back lights being positioned on a left side of a center of said back side of said body of said jersey, said left numeral of said pair of numerals of said plurality of back lights being centrally located between said collar and said bottom edge of said body of said jersey, a right numeral of said pair of numerals of said plurality of back lights being positioned on a right side of said center of said back side of said body of said jersey, said right numeral of said pair of numerals of said plurality of back lights being centrally located between said collar and said bottom edge of said body of said jersey;

a control housing being attached to said jersey, said control housing being located on a portion of said collar which extends around said back side of said body of said jersey, said control housing being located on an outwardly facing surface of said collar wherein said control housing is configured to be accessible to the player;

a processor being positioned within said control housing, said processor being in electrical communication with each front light of said plurality of front lights, said processor being in electrical communication with each back light of said plurality of back lights;

an electronic memory being positioned within said control housing, said electronic memory being in electrical communication with said processor, said electronic memory storing a database comprising a plurality of digits ranging between zero and nine;

a selector switch being slidably integrated into said control housing, said selector switch being in electrical communication with said processor, said selector switch being positionable in an off position, said processor being de-actuated when said selector switch is in said off position, said selector switch being positionable in a left position, each front light of said plurality of front lights associated with said left numeral of said pair of numerals of said plurality of front lights being actuated into a standby mode when said selector switch is positioned in said left position, each back light of said plurality of back lights associated with said left numeral of said pair of numerals of said plurality of back lights being actuated into a standby mode when said selector switch is positioned in said left position, said selector switch being positionable in a right position, each front light of said plurality of front lights associated with said right numeral of said pair of numerals of said plurality of front lights being actuated into a standby mode when said selector switch is positioned in said right position, each back light of said plurality of back lights associated with said right numeral of said pair of numerals of said plurality of back lights being actuated into a standby mode when said selector switch is positioned in said right position, said selector switch being laterally slidable along a channel which is recessed into an outwardly facing surface of said control housing, said channel being positioned beneath a top side of said control housing, said channel being elongated along an axis extending between a first lateral side of said control housing and a second lateral side of said control housing;

said control housing having left indicia being applied to said outwardly facing surface of said control housing, said left indicia being positioned between a first lateral bounding edge of said channel and said first lateral side of said control housing, said left indicia comprising the letter "L";

said control housing having right indicia being applied to said outwardly facing surface of said control housing, said right indicia being positioned between a second lateral bounding edge of said channel and said second lateral side of said control housing, said right indicia comprising the letter "R";

said control housing having off indicia being applied to said outwardly facing surface of said control housing, said off indicia being positioned beneath a lower bounding edge of said channel, said off indicia being centrally located between said first lateral bounding edge of said channel and said second lateral bounding edge of said channel, said off indicia comprising the letter "O";

a first digit selector button being movably positioned in said control housing, said first digit selector button being in electrical communication with said processor, said electronic memory communicating a respective digit of said plurality of digits to said processor each time said first digit selector is pressed for controlling a first digit of said plurality of digits each of said plurality of front lights and said plurality of back lights is actuated to display, said plurality of front lights associated with said left numeral of said pair of numerals of said plurality of front lights being actuated in a pattern which corresponds to said respective digit of said plurality of digits each time said first digit selector button is depressed when said selector switch is in said left position wherein said first digit selector button is configured to enable the player to determine which digit of said plurality of digits said left numeral of said pair of numerals of said plurality of front lights is actuated to display, said plurality of back lights associated with said left numeral of said pair of numerals of said plurality of back lights being actuated in a pattern which corresponds to said respective digit of said plurality of digits each time said first digit selector button is depressed when said selector switch is in said left position wherein said first digit selector button is configured to enable the player to determine which digit of said plurality of digits said left numeral of said pair of numerals of said plurality of back lights is actuated to display, said plurality of front lights associated with said right numeral of said pair of numerals of said plurality of front lights being actuated in a pattern which corresponds to said respective digit of said plurality of digits each time said first digit selector button is depressed when said selector switch is in said right position wherein said first digit selector button is configured to enable the player to determine which digit of said plurality of digits said right numeral of said pair of numerals of said plurality of front lights is actuated to display, said plurality of back lights associated with said right numeral of said pair of numerals of said plurality of back lights being actuated in a pattern which corresponds to said respective digit of said plurality of digits each time said first digit selector button is depressed when said selector switch is in said right position wherein said first digit selector button is configured to enable the player to determine which digit of said plurality of digits said right numeral of said pair of numerals of said plurality of back lights is actuated to display, said first digit selector button being depressible with respect to said outwardly facing surface of said control housing, said first digit selector button being positioned between said channel in said outwardly facing surface of said control housing and a bottom side of said control housing, said first digit selector button being positioned closer to said first lateral side of said control housing than said second lateral side of said control housing, said first digit selector button being comprised of a deformable material wherein said first digit selector button is configured to enhance comfort for the user when the user presses said first digit selector button;

a second digit selector button being movably positioned in said control housing, said second digit selector button being in electrical communication with said processor, said electronic memory communicating a respective digit of said plurality of digits to said processor each time said second digit selector is pressed for controlling a second digit of said plurality of digits each of said plurality of front lights and said plurality of back lights is actuated to display, said plurality of front lights associated with said left numeral of said pair of numerals of said plurality of front lights being actuated in a pattern which corresponds to said respective digit of said plurality of digits each time said second digit selector button is depressed when said selector switch is in said left position wherein said second digit selector button is configured to enable the player to determine which digit of said plurality of digits said left numeral of said pair of numerals of said plurality of front lights is actuated to display, said plurality of back lights associated with said left numeral of said pair of numerals of said plurality of back lights being actuated in a pattern which corresponds to said respective digit of said plurality of digits each time said second digit selector button is depressed when said selector switch is in said left position wherein said second digit selector button is configured to enable the player to determine which digit of said plurality of digits said left numeral of said pair of numerals of said plurality of back lights is actuated to display, said plurality of front lights associated with said right numeral of said pair of numerals of said plurality of front lights being actuated in a pattern which corresponds to said respective digit of said plurality of digits each time said second digit selector button is depressed when said selector switch is in said right position wherein said second digit selector button is configured to enable the player to determine which digit of said plurality of digits said right numeral of said pair of numerals of said plurality of front lights is actuated to display, said plurality of back lights associated with said right numeral of said pair of numerals of said plurality of back lights being actuated in a pattern which corresponds to said respective digit of said plurality of digits each time said second digit selector button is depressed when said selector switch is in said right position wherein said second digit selector button is configured to enable the player to determine which digit of said plurality of digits said right numeral of said pair of numerals of said plurality of back lights is actuated to display, said second digit selector button being depressible with respect to said outwardly facing surface of said control housing, said second digit selector button being positioned between said channel in said outwardly facing surface of said control housing and said bottom side of said control housing, said second digit selector button being positioned closer to said first lateral side of said control housing than said second lateral side of said control housing, said second digit selector button being comprised of a deformable material wherein said second digit selector button is configured to enhance comfort for the user when the user presses said second digit selector button; and a power supply being positioned within said control housing, said power supply being in electrical communication with said processor, said power supply comprising at least one battery.

* * * * *